United States Patent
Bernecker

(10) Patent No.: US 6,220,811 B1
(45) Date of Patent: Apr. 24, 2001

(54) APPARATUS AND METHOD FOR HANDLING AND TRANSPORTING BALES

(76) Inventor: Michael J. Bernecker, 279 10th St., Prairie Farm, WI (US) 54762

( * ) Notice: Subject to any disclaimer, the term of this patent is extended or adjusted under 35 U.S.C. 154(b) by 0 days.

(21) Appl. No.: 09/377,021

(22) Filed: Aug. 18, 1999

Related U.S. Application Data

(60) Provisional application No. 60/097,263, filed on Aug. 20, 1998.

(51) Int. Cl.$^7$ .................................................. A01D 90/00

(52) U.S. Cl. ........................ 414/555; 414/24.5; 294/107; 294/2

(58) Field of Search ................................ 294/107, 2, 105, 294/902; 301/128; 212/302, 304; 414/555, 486, 24.5

(56) References Cited

U.S. PATENT DOCUMENTS

| | | | |
|---|---|---|---|
| 2,957,592 | * 10/1960 | Thacker | ............................ 280/755 X |
| 3,421,791 | 1/1969 | Lindqvist . | |
| 3,445,014 | 5/1969 | Kullerback . | |
| 3,610,441 | 10/1971 | Grey et al. . | |
| 3,713,554 | 1/1973 | Thompson et al. . | |
| 3,800,966 | 4/1974 | Newton . | |
| 3,877,595 | 4/1975 | Edelman . | |
| 3,880,305 | 4/1975 | Van Polen . | |

(List continued on next page.)

FOREIGN PATENT DOCUMENTS

| | | | |
|---|---|---|---|
| 3933834 | * 10/1989 | (DE) | ..................................... 414/555 |
| 553602 | * 8/1993 | (EP) | ..................................... 414/555 |
| 2599014 | * 11/1987 | (FR) | ..................................... 294/107 |
| 956438 | * 4/1964 | (GB) | ..................................... 212/302 |
| 58-161632 | * 9/1983 | (JP) | ..................................... 212/302 |

OTHER PUBLICATIONS

Circle C Equipment LLC, American Eagle Big Bale Stacker, Brochure, 1997, Hermiston, OR.

Haying Mantis, Advertisement 182, Hay & Forage Grower, Mar. 1998, p. 45.

J.A. Freeman & Son, Inc., Model 5000 Big Bale Roadsider, Brochure, Pub. 0005000, Date Unknown.

Mountain View Equipment Company, MVE 8000 Self–Propelled Big Bale Bale Wagon, Brochure, Date Unknown, Caldwell, ID.

Stinger, Ltd., Stinger Bale Transport and Stinger Stacker, Brochure, Date Unknown, Haven, KS.

*Primary Examiner*—Steven A. Bratlie
(74) *Attorney, Agent, or Firm*—Skinner and Associates

(57) ABSTRACT

A vehicle bed, comprising a bed frame adapted for carrying a load, a fork including at least one tine, and a pivot mechanism adapted for pivoting the bed frame and the fork between a first position and a second position with respect to a vehicle frame. The fork is connected to an end of the bed frame and is substantially orthogonal to the bed frame. Loads are transported on the bed frame in the first position and are moved off or on the fork in the second position. The vehicle bed may be incorporated as part of a truck bed or as part of a trailer bed for a bale loading apparatus. The vehicle bed may include a lift mechanism including a lift cylinder adapted for lifting a load with respect to the vehicle frame to compensate for a load weight compressing a vehicle suspension. The bale loader includes a boom having a mast rotatably attached to a vehicle or trailer frame, a main boom pivotally attached to the mast, a jib boom pivotally attached to the main boom, and a head swivably attached to the jib boom. The boom is adapted for handling and stacking bales on the vehicle bed. The swivel head is preferably a two-in-one head adapted for handling dry bales and wet bales without puncturing plastic wrapped around the wet bales. The bale loader further includes at least one mobile outrigger operably attached to the vehicle frame and adapted for stabilizing the load. The mobile outrigger is telescopically extendible.

12 Claims, 19 Drawing Sheets

U.S. PATENT DOCUMENTS

| | | |
|---|---|---|
| 4,002,242 | 1/1977 | Eriksson . |
| 4,012,069 | 3/1977 | Carson . |
| 4,044,963 | 8/1977 | Hostetler . |
| 4,082,192 | 4/1978 | Cox . |
| 4,084,708 | 4/1978 | Goodwin . |
| 4,091,943 | 5/1978 | Bay-Schmith . |
| 4,103,831 | 8/1978 | Laudemann et al. . |
| 4,148,399 | 4/1979 | Carter et al. . |
| 4,190,391 | 2/1980 | Sesser et al. . |
| 4,253,786 | 3/1981 | Harkness . |
| 4,363,583 | 12/1982 | Bontrager . |
| 4,552,501 | 11/1985 | Clark et al. . |
| 4,564,325 | 1/1986 | Ackerman . |
| 4,573,845 | 3/1986 | Carpenter . |
| 4,578,008 | 3/1986 | Gleason . |
| 4,619,570 | 10/1986 | Siebenga . |
| 4,687,402 | 8/1987 | Zatylny . |
| 4,952,111 | 8/1990 | Callahan . |
| 4,971,504 | 11/1990 | Klompien . |
| 5,316,431 | 5/1994 | Barber . |
| 5,320,472 | 6/1994 | Matlack et al. . |
| 5,333,981 | 8/1994 | Pronovost et al. . |
| 5,397,208 | 3/1995 | Siebenga . |
| 5,405,229 | 4/1995 | Tilley et al. . |
| 5,490,755 | 2/1996 | Billotte . |
| 5,507,612 | 4/1996 | Siebenga . |
| 5,542,803 | 8/1996 | Driggs . |
| 5,607,274 | 3/1997 | Cook . |
| 5,700,124 | * 12/1997 | Dufraisse ............................. 414/111 |
| 5,975,832 | * 11/1999 | Winkler ................................ 414/555 |

* cited by examiner

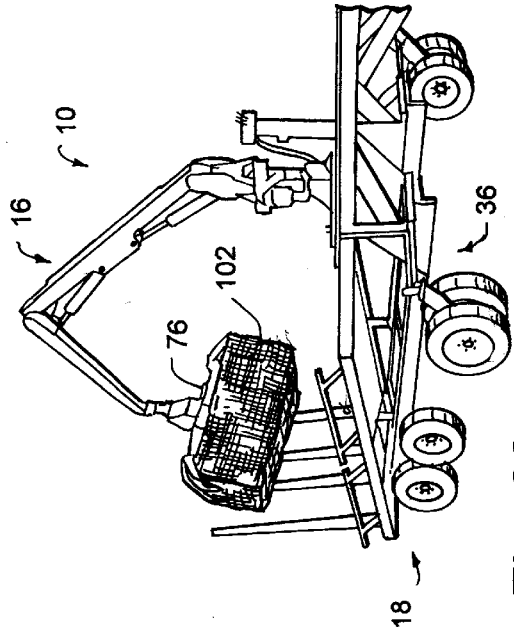
Fig. 23
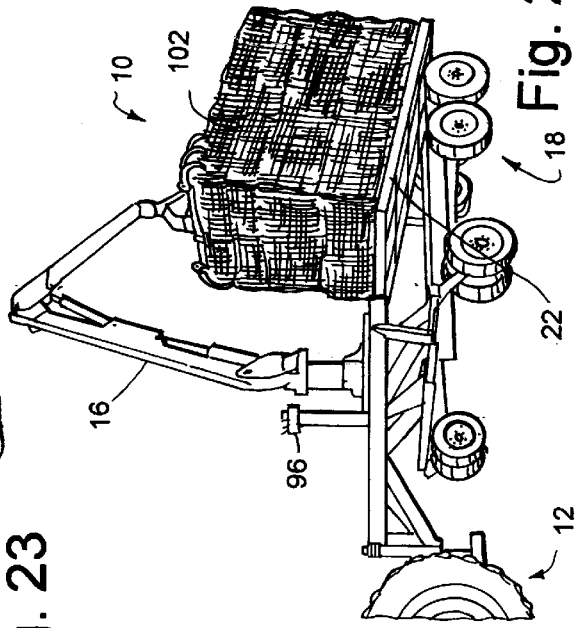
Fig. 26
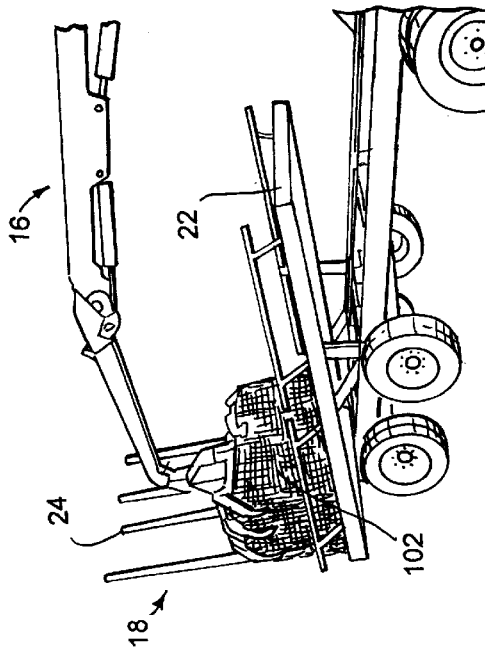
Fig. 24
Fig. 25

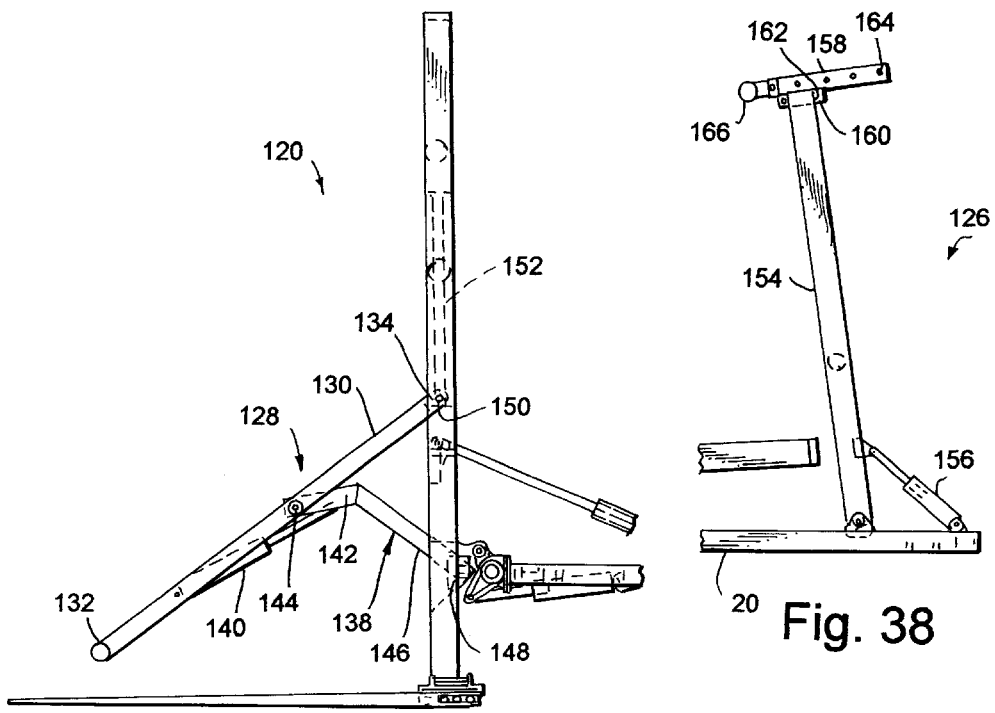
Fig. 36
Fig. 38
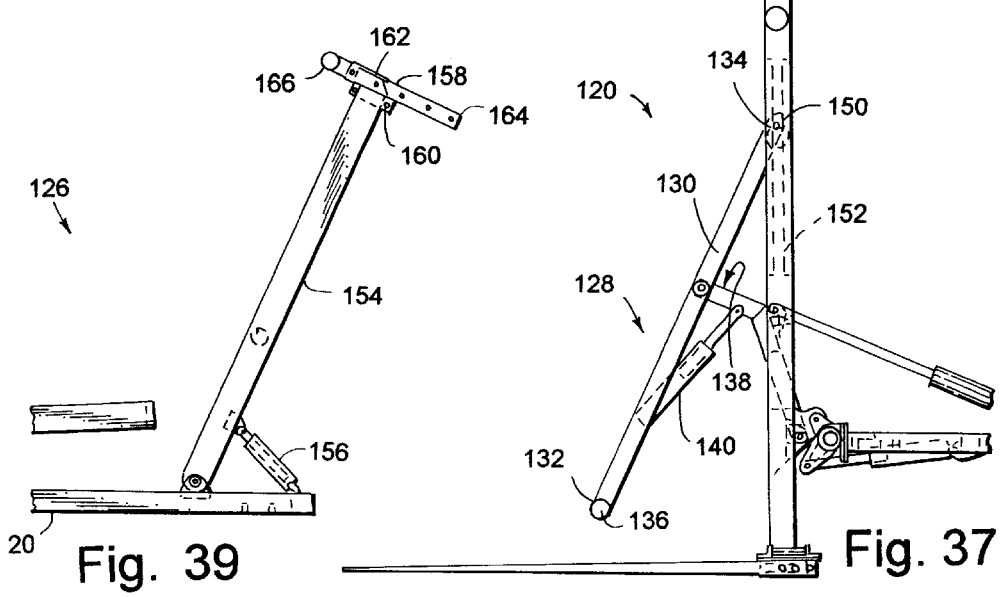
Fig. 39
Fig. 37

APPARATUS AND METHOD FOR HANDLING AND TRANSPORTING BALES

CROSS-REFERENCE TO RELATED APPLICATIONS

This application claims the benefit under 35 U.S.C. § 119(e) of co-pending provisional application Serial No. 60/097,263, filed Aug. 20, 1998. Application Serial No. 60/097,263 is hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention.

The present invention relates, generally, to apparatus and methods for handling and transporting loads. More particularly, the invention relates to apparatus and methods for handing and transporting large bales of hay.

2. Background Information.

Hay is generally pressed and secured into bales for ease of handling, transportation and storage. There are several types of hay bales. One type of bale is a small square bale having dimensions of about 2'×2'×3'. Another type of bale is a medium square bale that has approximate dimensions of 3'×3'×8'. Finally, there are large cylindrically shaped round bales and large square bales. Typical dimensions of a large square bale include 3'×4'×8' or 4'×4'×8'. Large round bales are typically 5' long and either 4' or 6' in diameter. A typical large bale weighs between 1,500 to 2,000 pounds.

The state of the art includes various devices and methods for loading and transporting bales of hay. Because of their relatively light weight, small square bales may be manually loaded and unloaded from a wagon or they may be automatically or semi-automatically loaded into a wagon using a shoot or ramp and a series of conveyors. However, using small bales to handle, transport and store the hay crop rather than large bales requires significantly more time and labor for a given quantity of hay, and causes the hay to lose considerably more leaves from the stems when it is processed into bales. Large square bales are gaining popularity over large round bales because they can be stacked or grouped more efficiently for transportation and storage.

Because of their size, large bales must be moved by mechanical means. Known apparatus and methods for handling and transporting large hay bales are believed to have significant limitations and shortcomings. Typically, a fork lift or front end loader lifts the bales onto a truck. Some of these trucks may include booms, gripping devices, front end loaders and/or forks to load the bales on the trucks and eliminate the need for a separate fork lift or front end loader. Additionally, when operating on hilly terrain, trucks with booms may be unstable when they are lifting bales, and trucks that rely on a gravity slide to stack bales may become ineffective or inoperative And because the suspension of these trucks are significantly compressed when heavy loads are lifted, it can become difficult for the fork to properly slide under the bales and load the bales on the vehicle. Furthermore, known baler loaders will often rip the plastic wrapped around wet bales and allow moisture and air to enter the bale.

The present invention provides an apparatus and method for handling and transporting bales which is believed to constitute an improvement over the known art.

BRIEF SUMMARY OF THE INVENTION

The present invention provides apparatus and methods for handling and transporting large bales using a pivoting vehicle bed. The vehicle bed may be included in a number of embodiments, including a truck bed embodiment and a bale loader embodiment. For the purpose of this specification, the term "vehicle" denotes any vehicle including motorized trucks, tractors and other equipment, and non-motorized trailers and wagons. The term "vehicle bed" denotes a bed for any such vehicle. The bale loader may be used in the field to pick up and stack large hay bales in a predetermined configuration on the vehicle bed. Once the stack of bales is complete, the bale loader tilts the vehicle bed to unload the stack of bales on the ground, either with or without a pallet. The truck bed embodiment can then load the stack of bales in the field and transport them to a storage area.

The vehicle bed generally comprises a bed frame adapted for carrying a load, a fork including at least one tine, and a pivot mechanism adapted for pivoting the bed frame and the fork between a first position and a second position with respect to a vehicle frame. The fork is connected to an end of the bed frame and is substantially orthogonal to the bed frame. Loads are transported on the bed frame in the first position and are moved off or on the fork in the second position. In the truck bed embodiment, for example, the vehicle bed may include a lift mechanism adapted for lifting a load with respect to the vehicle frame to compensate for the compressed vehicle suspension caused by a load weight. The vehicle bed is incorporated into a trailer in the bale loader embodiment, which includes a boom having a mast rotatably attached to a vehicle or trailer frame, a main boom pivotally attached to the mast, a jib boom pivotally attached to the main boom, and a head swivably attached to the jib boom. The boom is adapted for handling and stacking bales on the vehicle bed. The swivel head is preferably a two-in-one head adapted for handling dry bales and wet bales without puncturing plastic wrapped around the wet bales. A preferred bale loader further has at least one mobile outrigger operably attached to the vehicle frame and adapted for stabilizing the load. The mobile outrigger is extendible and preferably is telescopically extendible. Each outrigger has at least one tire and preferably has caster-like dual tires mounted on a spindle within a bronze bushing sleeve. The bale loader is hydraulically powered, maneuvered and operated using a farm tractor. A hitch portion of the vehicle frame attaches the frame to the tractor. Hydraulic controls either on the trailer next to the mast of the boom or in the tractor cab control the motion of the boom.

Significant features of the bale loader include, but are not limited to, the use of mobile outriggers to provide stability in the fields, the ability of the head on the boom to grab either wet and dry bales, the ability to handle both round and large square bales, floating tines capable of handling standard or dumb pallets, and the ability to be attached to and powered and maneuvered by a typical farm tractor. Significant features of the bale truck include, but are not limited to, the ability to load and transport stacks of large square bales, floating tines capable of handling standard or dumb pallets, a lift mechanism adapted for lifting a load with respect to the vehicle frame to compensate for a compressed vehicle suspension caused by a: load weight, push offs adapted for assisting in the removal of the stack of bales off of the tines, and a squeeze bar adapted for holding a load of bales on a bed frame.

The features, benefits and objects of this invention will become clear to those skilled in the art by reference to the following description, claims, if any, and drawings.

BRIEF DESCRIPTION OF THE SEVERAL VIEWS OF THE DRAWING

FIG. 23 is an illustration showing the boom of the bale loader apparatus lifting the dry bale over the trailer.

FIG. 24 is an illustration showing the boom of the bale loader apparatus placing the dry bale on the vehicle bed.

FIG. 25 is an illustration showing the bed pivoted in a near vertical, second position and a pallet positioned over the forks.

FIG. 26 is an illustration showing the boom of the bale loader apparatus placing a bale on the trailer.

FIG. 36 is a side view of the lift portion of the truck bale loader apparatus of FIG. 35 with push offs in a partially extended position.

FIG. 37 is a side view of the lift portion of the truck bale loader apparatus of FIG. 35 with push offs in an extended position.

FIG. 38 is a side view of the truck bale loader apparatus of FIG. 35 with a squeeze bar in a hold position.

FIG. 39 is a side view of the truck bale loader apparatus of FIG. 35 with a squeeze bar in a release position.

DETAILED DESCRIPTION

Figures 1, 2:
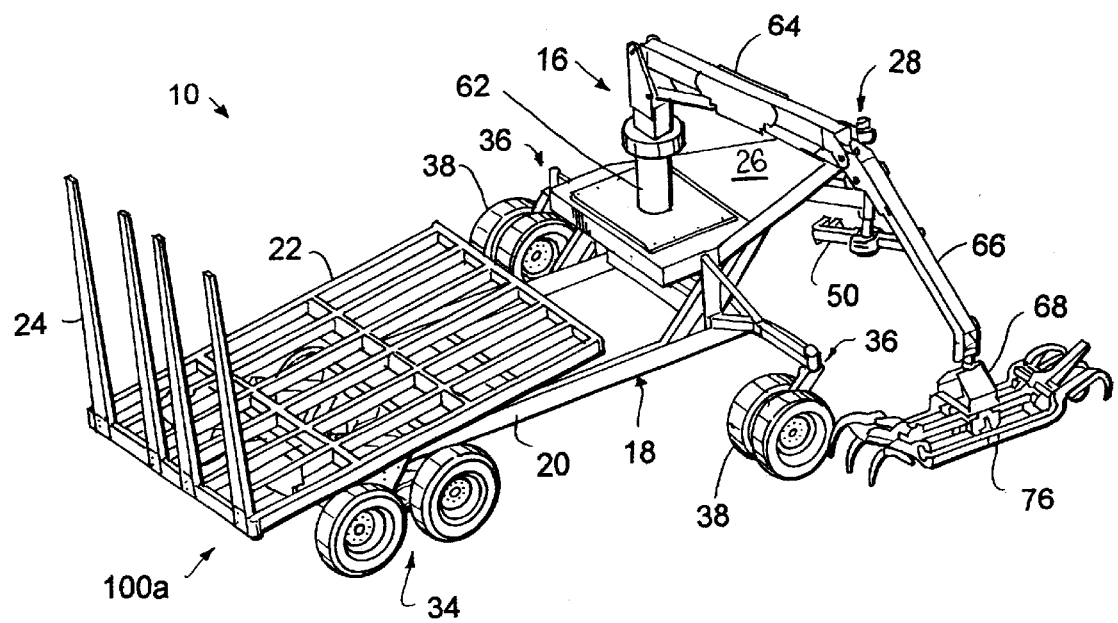
FIG. 1 is a perspective view of a bale loader apparatus.
FIG. 2 is a front view of the bale loader apparatus.
Figure 3:
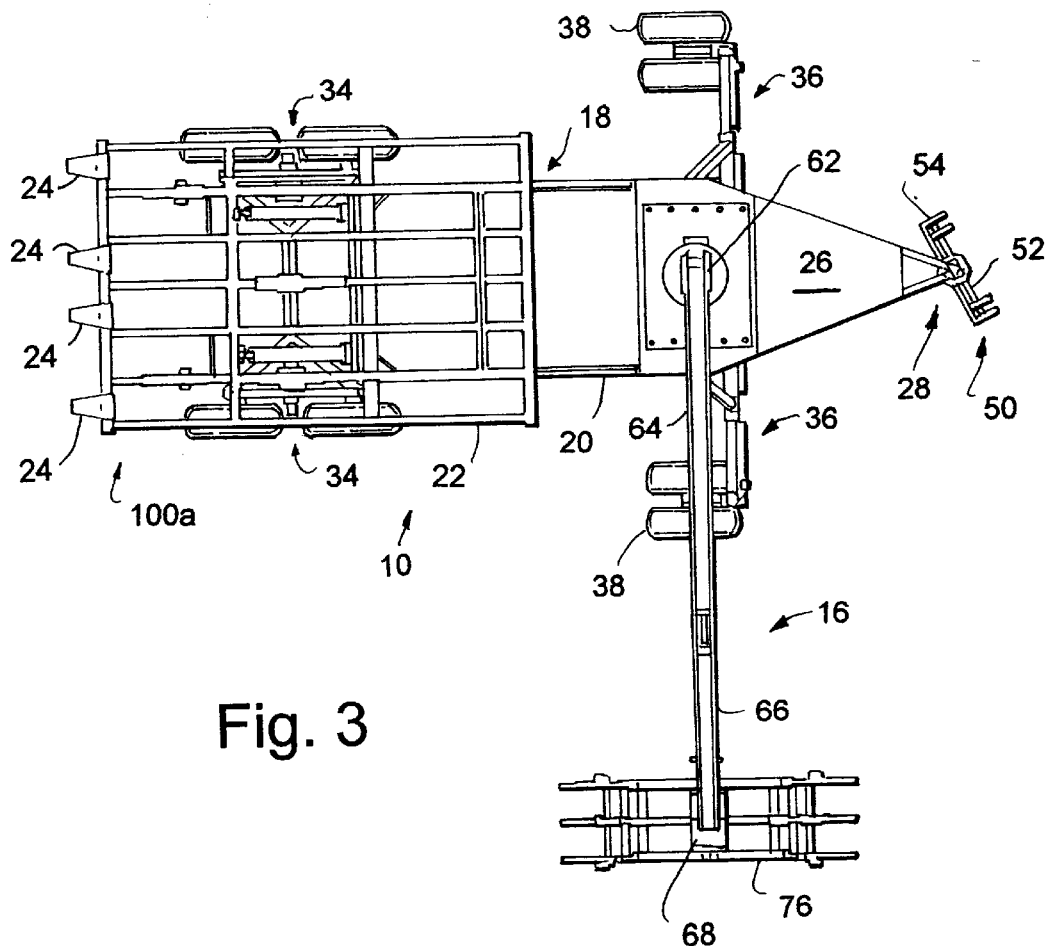
FIG. 3 is a top view of the bale loader apparatus.
Figure 4:
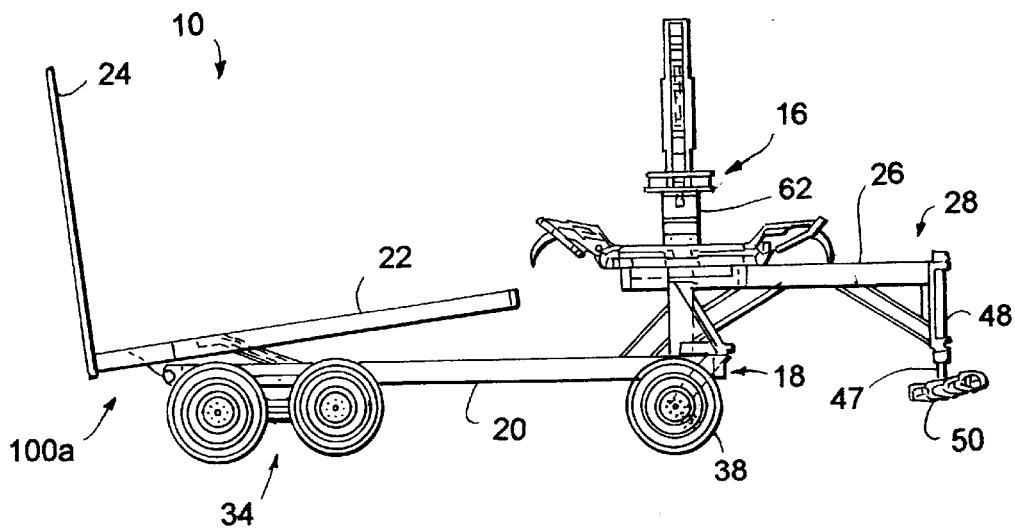
FIG. 4 is a side view of the bale loader apparatus.
Figure 5:
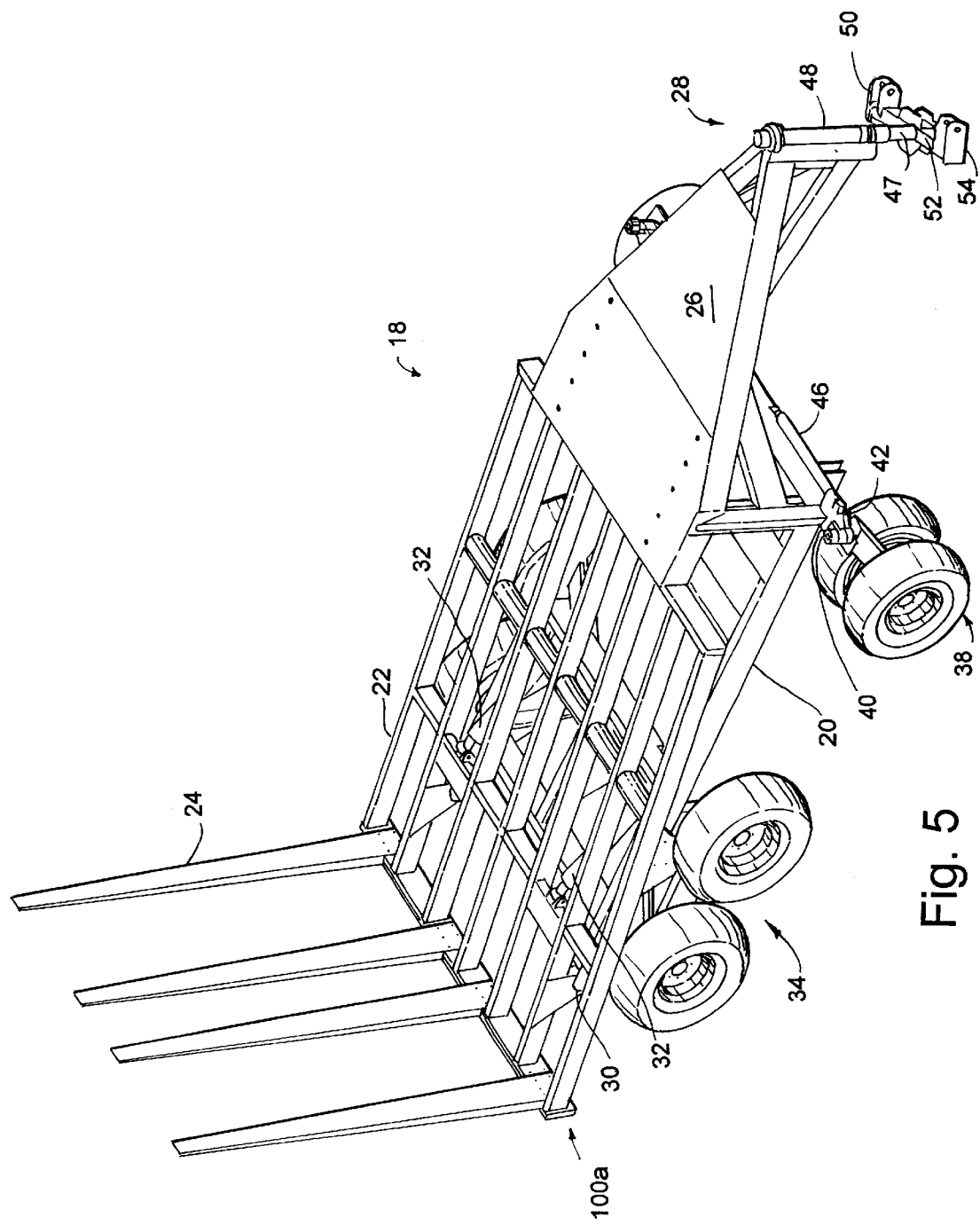
FIG. 5 is a perspective view of the trailer of the bale loader apparatus with a bed frame in a first position.
Figure 6:
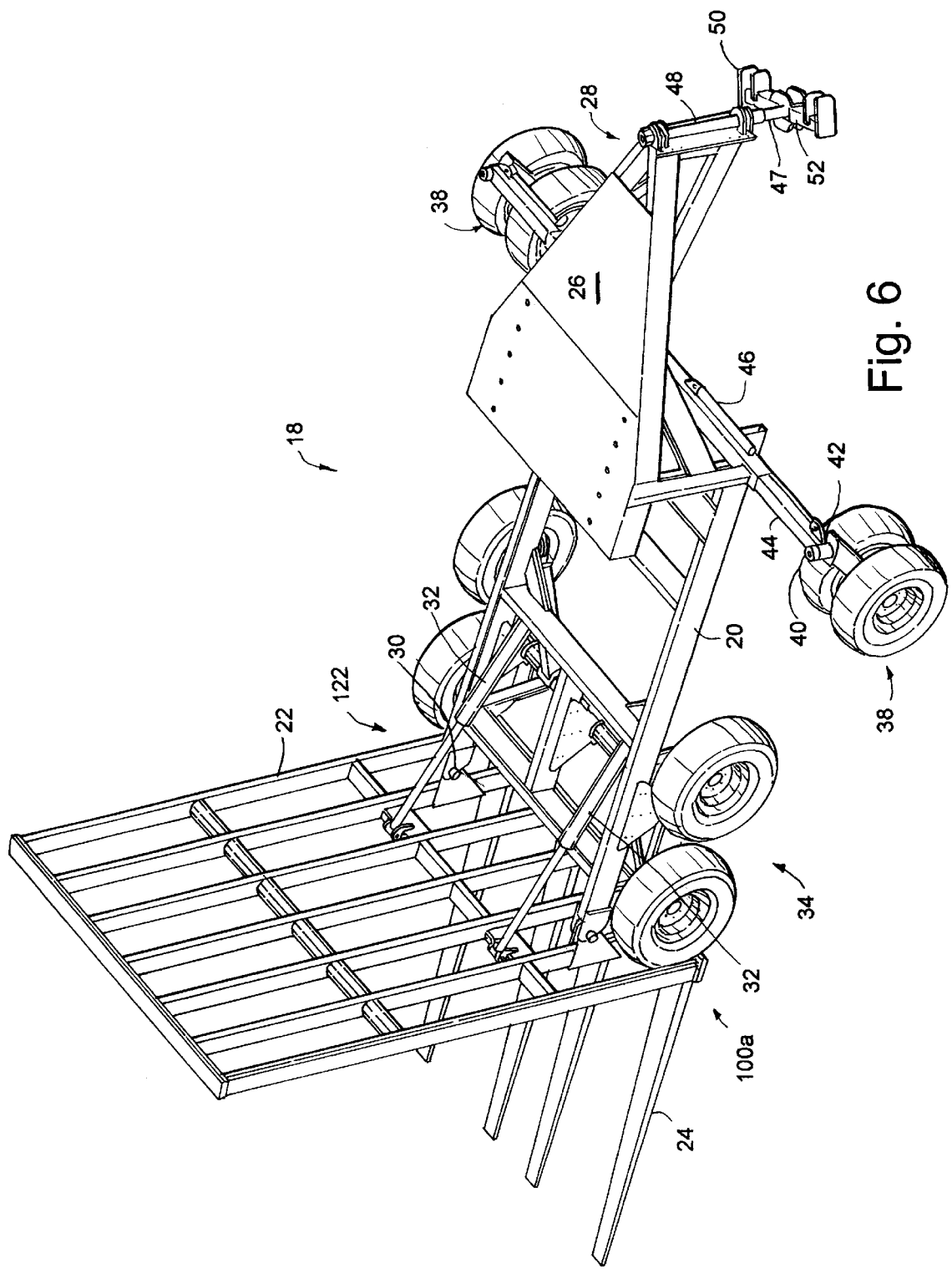
FIG. 6 is a perspective view of the trailer of the bale loader apparatus with a bed frame in a second position.
Figure 7:
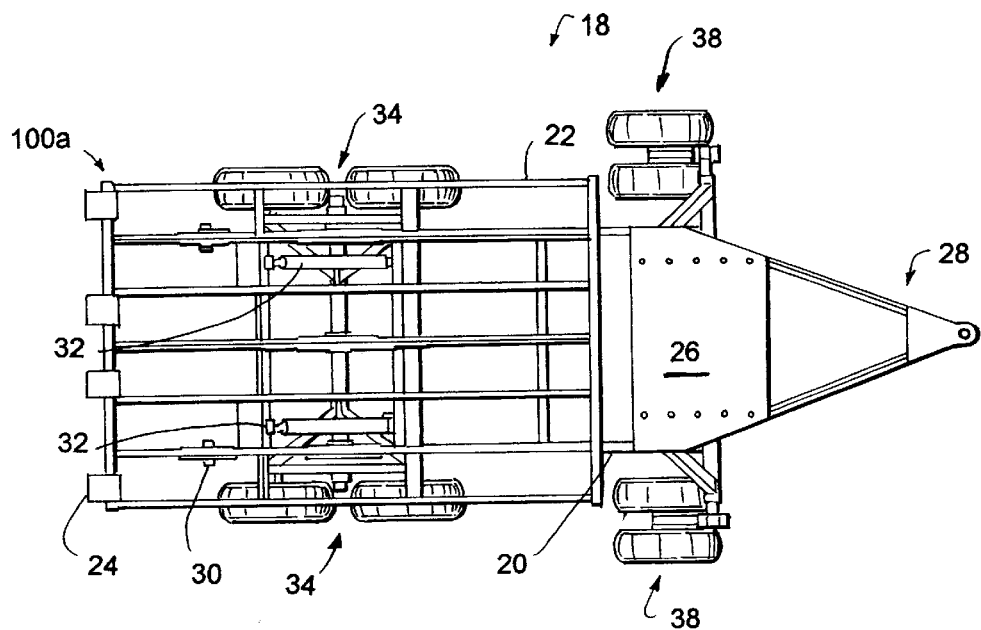
FIG. 7 is a top view of the trailer of the bale loader apparatus.
Figure 8:
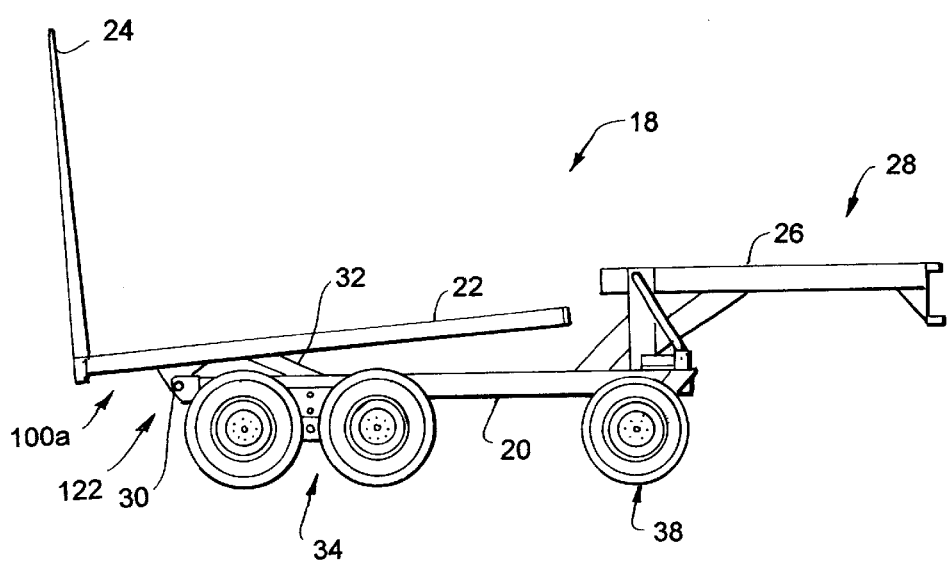
FIG. 8 is a side view of the trailer of the bale loader apparatus.
Figure 9:
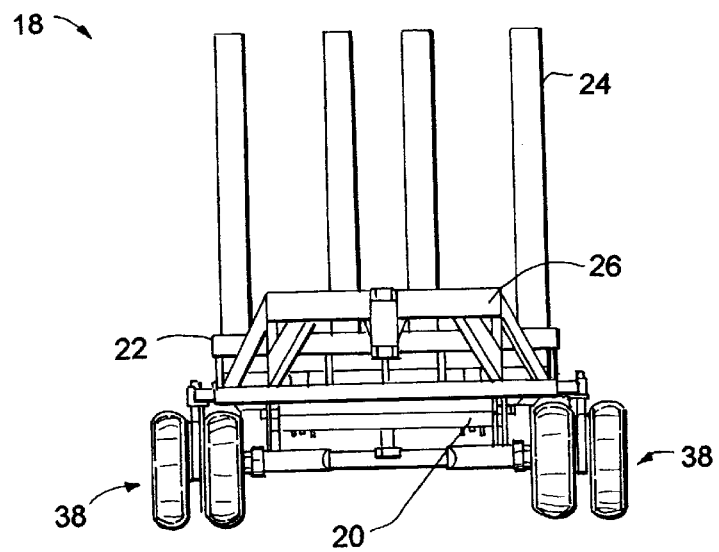
FIG. 9 is a front view of the trailer of the bale loader apparatus.
Figure 10:
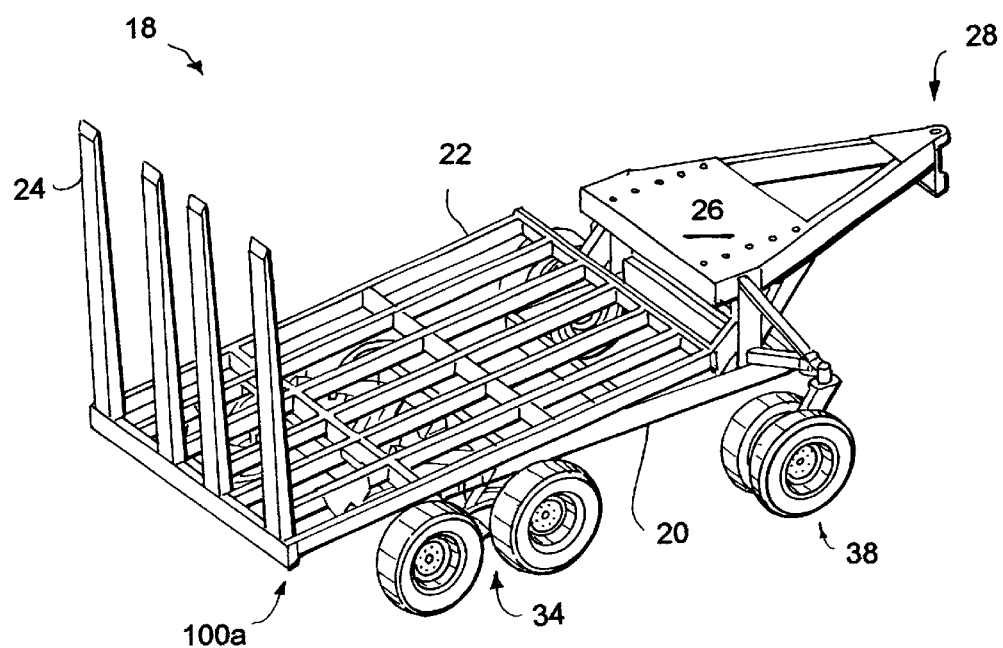
FIG. 10 is a perspective view of the trailer of the bale loader apparatus.
Figure 11:
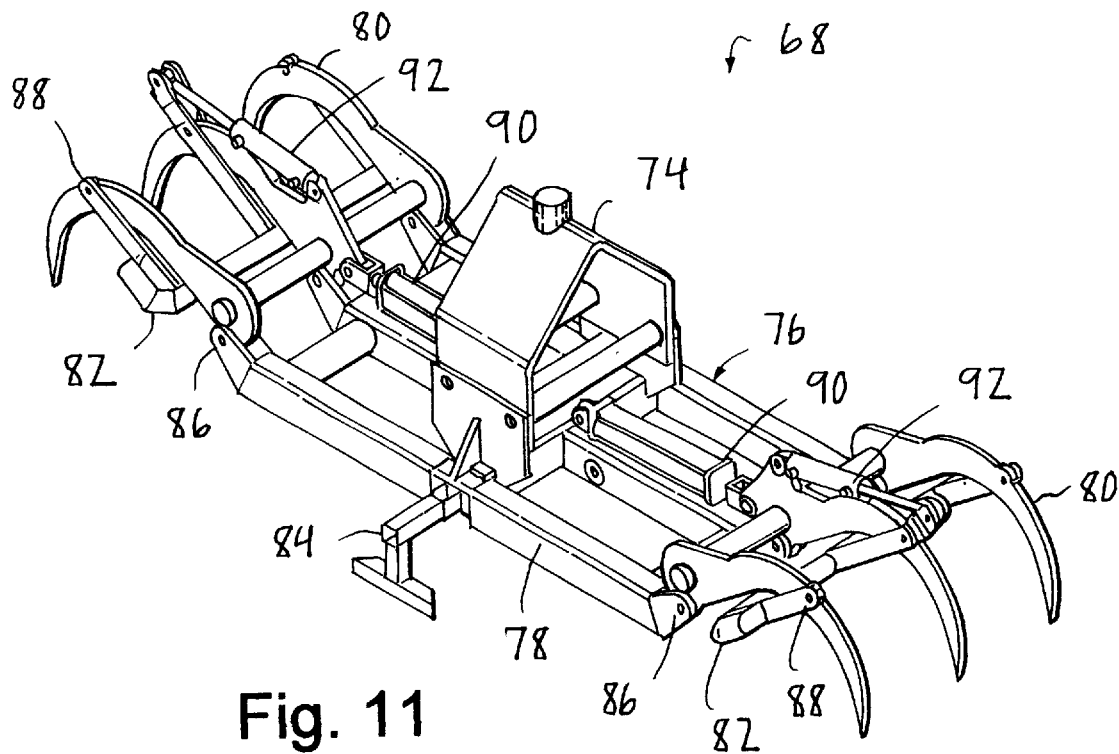
FIG. 11 is a perspective view of the head of the bale loader apparatus with the bumper bars positioned to handle a dry bale.
Figure 12:
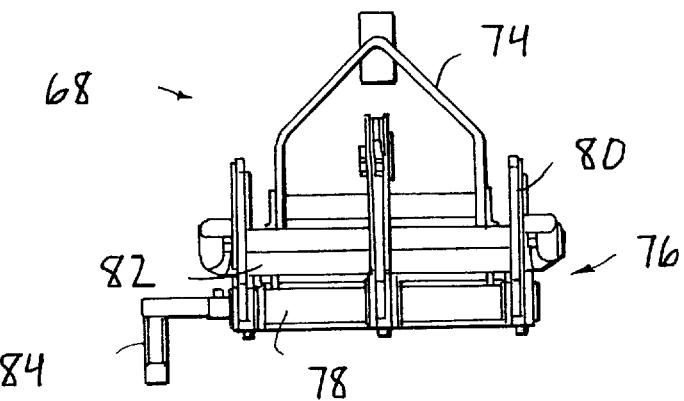
FIG. 12 is a side view of the head of FIG. 11.
Figure 13:
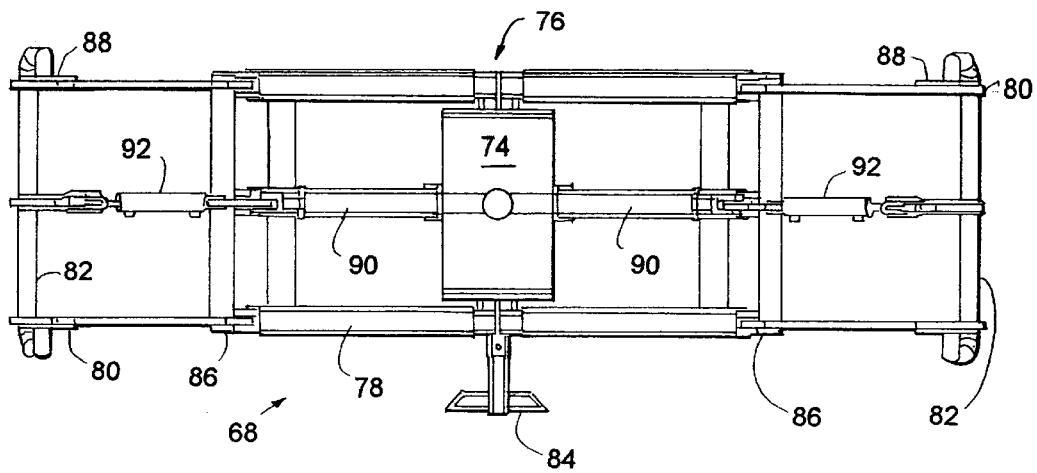
FIG. 13 is a top view of the head of FIG. 11.
Figure 14:
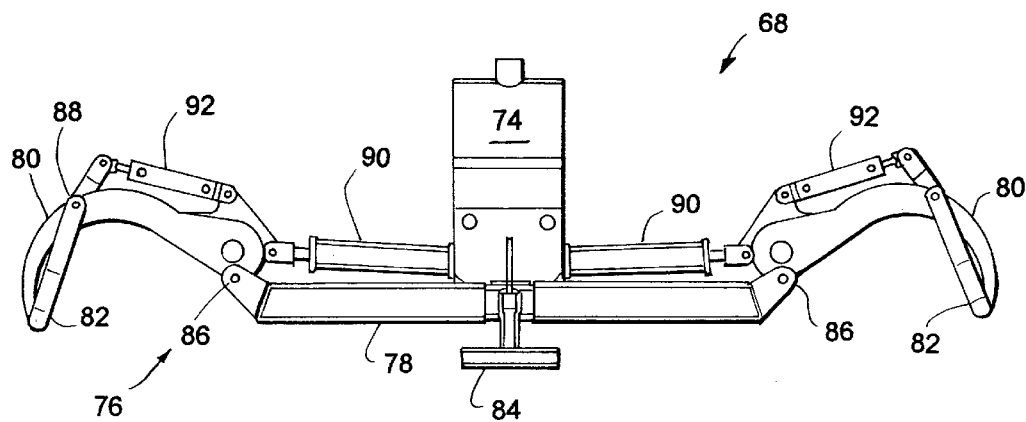
FIG. 14 is a front view of the head of FIG. 11.
Figure 15:
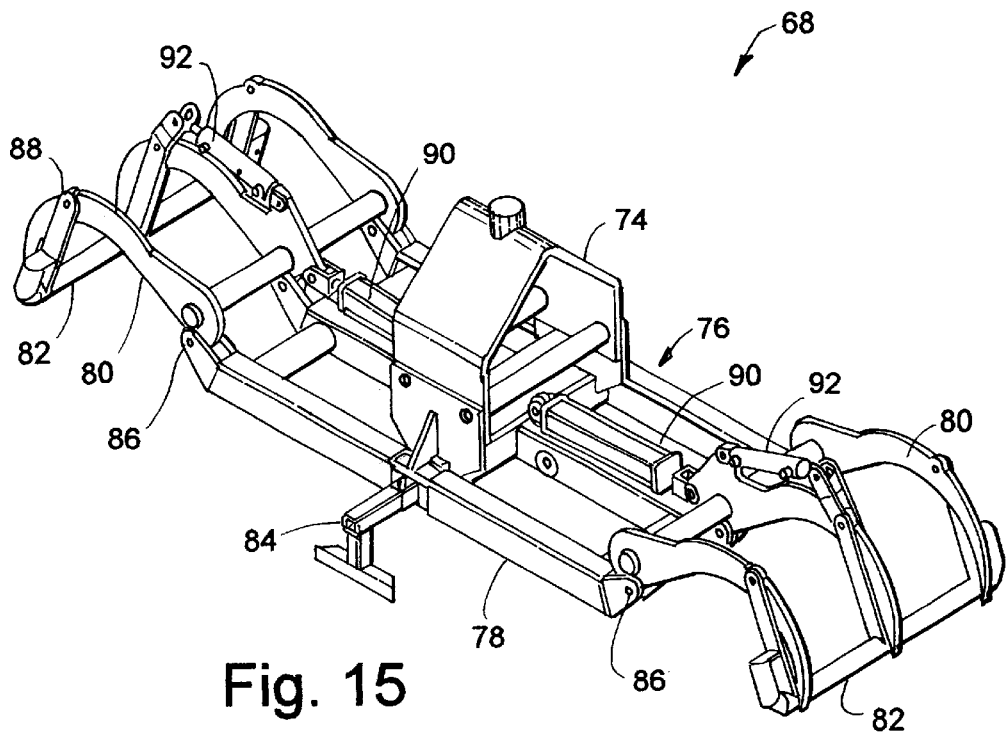
FIG. 15 is a perspective view of the head of the bale loader apparatus with the bumper bars positioned to handle a wet bale.
Figure 16:
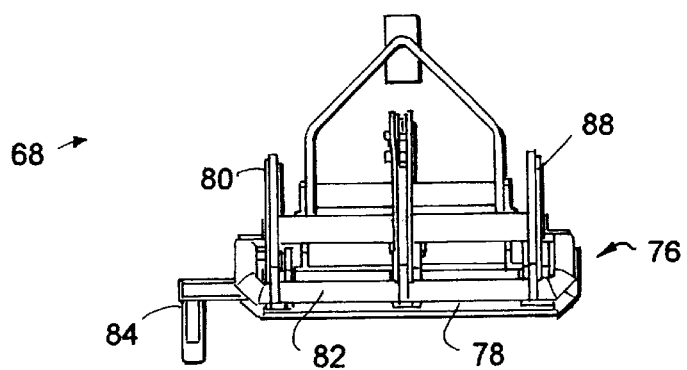
FIG. 16 is a side view of the head of FIG. 15.
Figure 17:
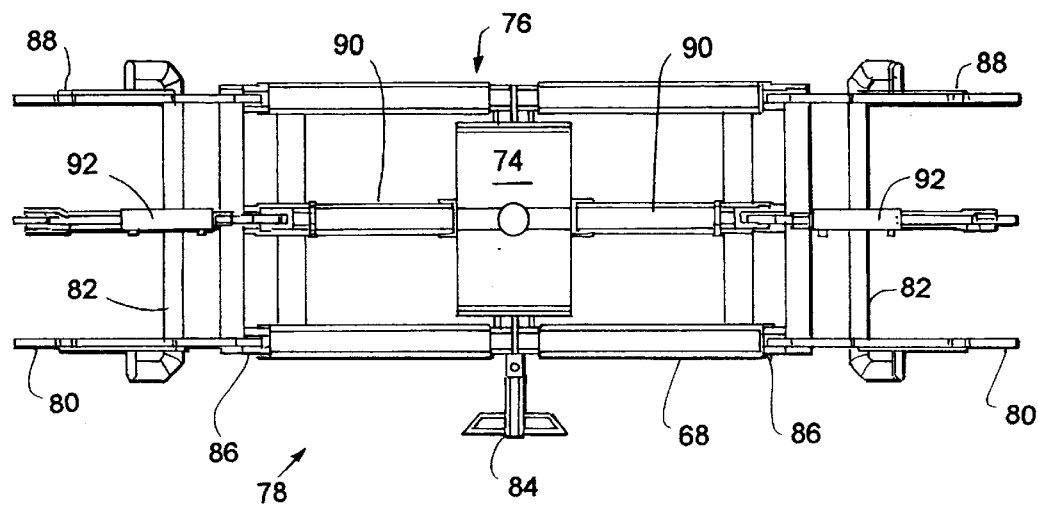
FIG. 17 is a top view of the head of FIG. 15.
Figure 18:
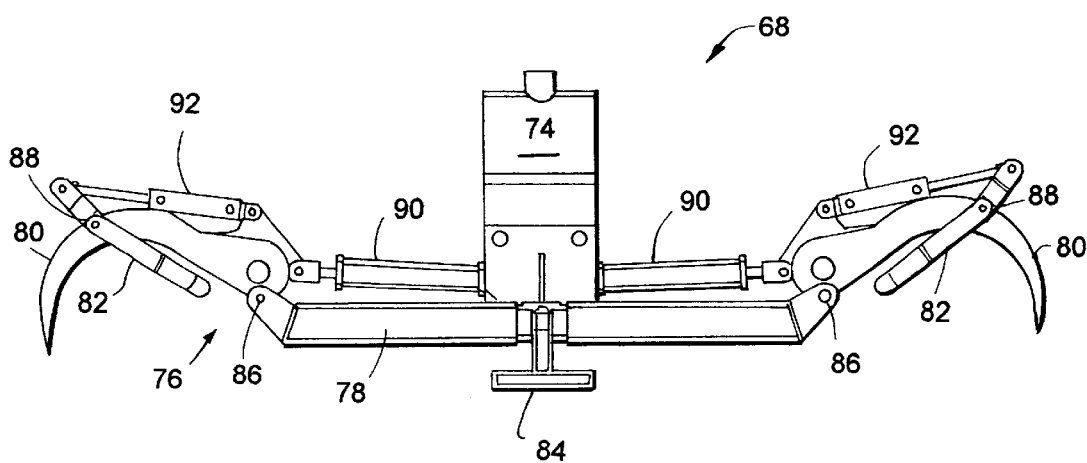
FIG. 18 is a front view of the head of FIG. 15.
Figure 20:
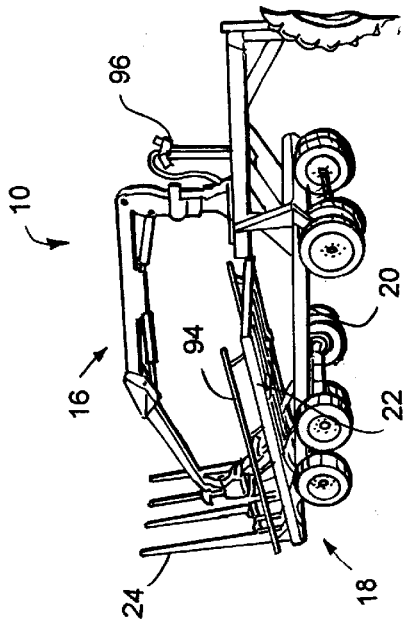
FIG. 20 is an illustration showing the front end of the bale loader apparatus being lifted by the two-point arms of the farm tractor.

The apparatus and methods for handling and transporting large bales using a pivoting vehicle bed is described first in terms of a bale loader embodiment and then in terms of a truck bed embodiment. The vehicle bed within the bale loader embodiment is generally indicated by the reference number 100*a*, and the vehicle bed within the truck bed embodiment is generally illustrated by the reference number 100*b*.

Referring to FIGS. 1–4, an example of the bale loader embodiment of the present invention is illustrated and generally indicated by the reference numeral 10. The bale loader 10 is maneuvered and hydraulically powered by a farm tractor 12, as shown in FIGS. 19–31. The bale loader 10 generally comprises a hydraulically powered boom 16 mounted onto a trailer 18 which incorporates the vehicle bed 100*a*.

The trailer 18 generally comprises a trailer or vehicle frame 20, an open frame bed or bed frame 22, a fork formed from at least one tine 24 which forms a back of the trailer 18, a raised platform 26 upon which the boom 16 is mounted, and a hitch portion 28 for connection to the tractor 12. The bed frame 22 is pivotally connected to the back of the vehicle frame 20 using pivot bed hinges 30, which function as part of a pivot mechanism 122 adapted for pivoting the bed frame 22 and the fork between a first position and a second position with respect to the vehicle frame 20. The tines 24 of the fork are attached to the back of the vehicle frame 20 at an approximate right angle, i.e. the tines 24 are substantially orthogonal to the bed frame 22. A pair of 4×30 tilt cylinders 32 operably attached to the bed frame 22 and the vehicle frame 20 control the tilt of the bed frame 22. The trailer 18 is constructed and arranged in a manner where the bed frame 22 is substantially horizontal in a first position and the fork contacts or nearly contacts the ground when the bed frame 22 is pivoted to a vertical or second position. The bed frame 22 is preferably constructed as an open frame to allow hay chaff to fall through the bed frame and onto the ground. Strong tines 24 are economically produced using multi-ply steel, preferably 7 plies.

A tandem set of wheels 34 are attached to the frame 20 toward the rear of the trailer 18. A pair of mobile outriggers 36, each with a wheel and preferably with a caster-like dual set of wheels 38, is attached near the front of the vehicle frame 20. The dual set of wheels 38 pivot on a spindle 40 inside a bronze bushing sleeve 42. The outriggers 36 have a body 44, preferably square tubing, that telescopically extends out of the frame 20. Each outrigger 36 has a 2×24 outrigger cylinder 46 capable of extending the dual set of wheels 38 away from the frame 20, thus providing a movable, stable base for the operation of the boom 16. The outriggers 36 are extended and retracted when the front of the trailer 18 is lifted off of the ground by the tractor 12. Alternatively to having a telescoping square tubing body 44, each mobile, extendible outrigger 36 may be a more conventional hinged outrigger with a wheel attached to the distal end. This alternative mobile outrigger 36 could be hinged to the frame 20 and pivoted off of the ground using hydraulic cylinders. However, this alternative, hinged mobile outrigger 36 design raises the center of gravity as the outrigger 36 pivots the wheels 38 above the ground and thus may make the bale loader 10 more unstable.

The platform 26 is preferably raised higher than the bed 22 and is preferably positioned over the mobile outriggers 36 in order to provide the boom 16 with a stable base. The hitch portion 28 is attached to the platform 26 opposite the bed frame 22. The hitch portion 28 generally includes a pivot shaft 47 within a greasable bronze bushing sleeve 48, and a two-point attachment 50 connected to the pivot shaft 47. The two-point attachment 50 comprises a cross bar 52 and a pair of two parallel link plates 54. A link pin is inserted through apertures in the link plates 54 and through the aperture in the two-point arm of the tractor 12.

The boom 16 generally comprises a mast 62, a main boom 64 pivotally attached to the top of the mast 62, a jib boom 66 pivotally attached to the end of the main boom 64, and a head 68 swivably attached to the end of the jib boom 66. The mast 62 is rotatably moved using a hydraulic orbit motor and gearbox. The main boom 64 is pivotally moved using a main lift cylinder 70, the jib boom 66 is pivotally moved using a jib boom cylinder 72, and the position of the head 68 is controlled using an orbit motor.

Figure 22:
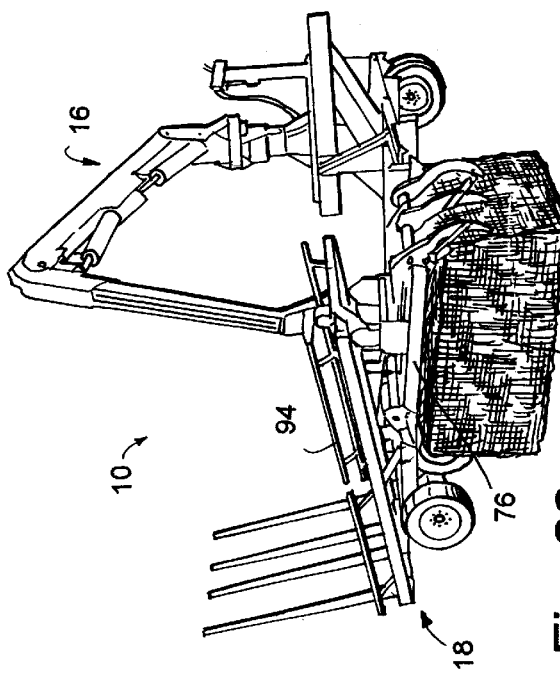
FIG. 22 is an illustration showing the head of the bale loader apparatus grabbing a dry bale.
Figure 19:
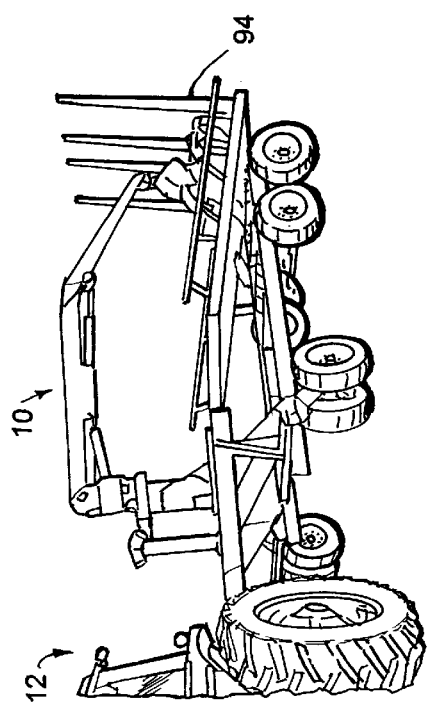
FIG. 19 is an illustration showing the bale loader apparatus being pulled by a farm tractor.
Figure 21:
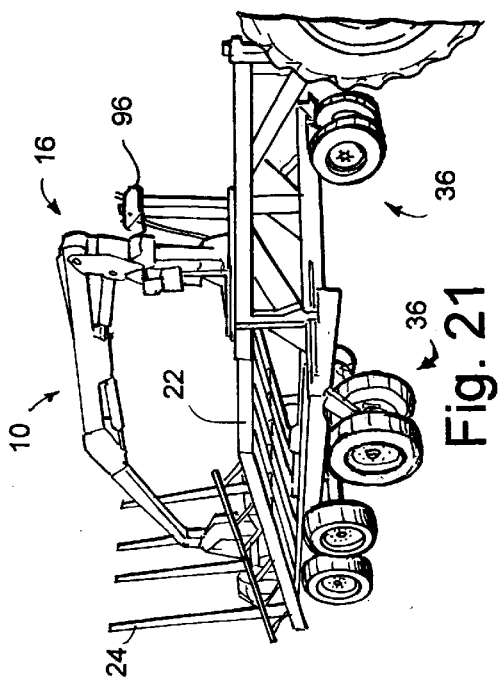
FIG. 21 is an illustration showing the bale loader apparatus with the mobile outriggers extended.
Figure 28:
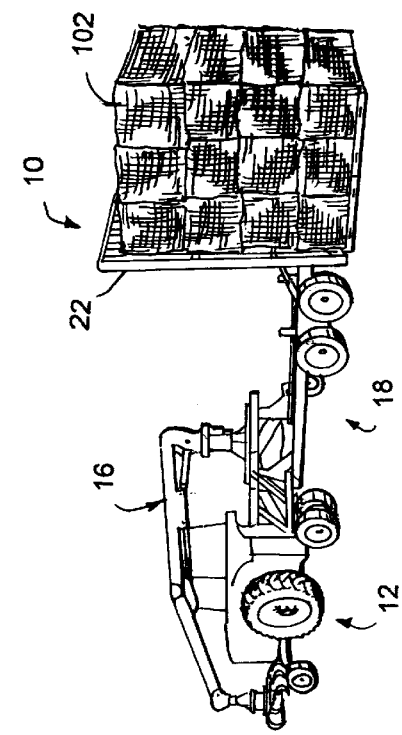
FIG. 28 is an illustration showing a completely tilted bed of the trailer and a palletized stack of bales standing in the field.

FIGS. 11–18 illustrate the head 68 in more detail. The head 68 generally comprises a swivel housing 74 and a grapple 76, which includes a frame 78, two sets of tines 80, two bumper bars 82, and an adjustable bale bumper or centering bar 84. As seen in FIGS. 22–24, the adjustable bale bumper 84 is used to ensure that the grapple 76 is grasping the center of the bale. The bale bumper 84 can be adjusted for different size bales. The tines 80 pivot about pins 86 on the frame 78, and the bumper bars 82 pivot about pins 88 on the tines 80. Tine cylinders 90 are used to extend and contract the tines 80, and bumper bar cylinders 92 are used to move the bumper bars 82 between a use and nonuse position. FIGS. 11–14 show the bumper bars 82 in a nonuse position for handling dry bales 102, wherein the tines 80 can sink into a dry bale 102 allowing the boom 16 to lift the bale. FIGS. 23–28 show the bale loader 10 moving dry bales 102.

Figure 30:
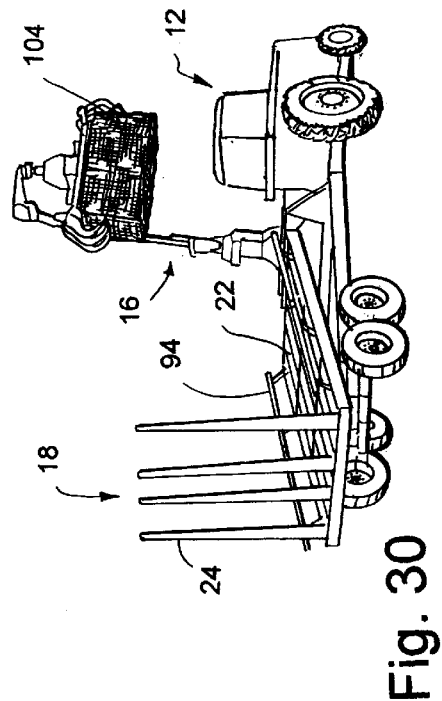
FIG. 30 is an illustration showing another perspective view of the bale loader apparatus grabbing a wet bale wrapped in plastic.
Figure 27:
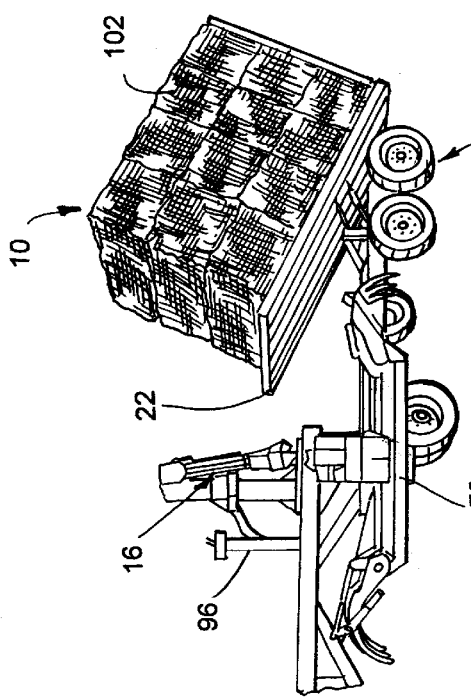
FIG. 27 is an illustration showing the vehicle bed pivoting from a horizontal, first position toward a vertical, second position to unload the bales as a palletized stack of bales.
Figure 29:
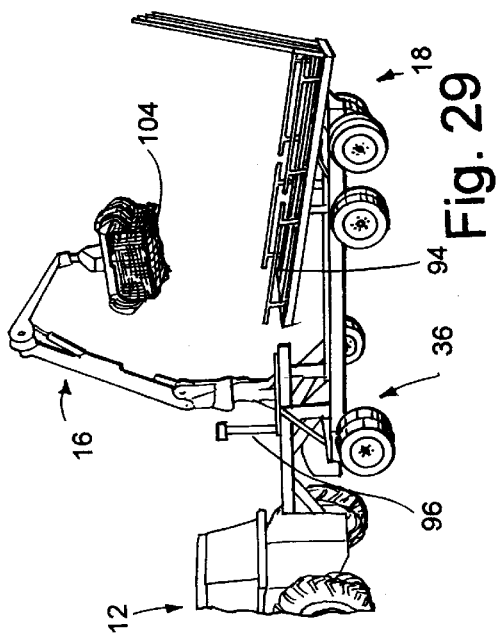
FIG. 29 is an illustration showing a perspective view of the bale loader apparatus grabbing a wet bale wrapped in plastic.
Figure 31:
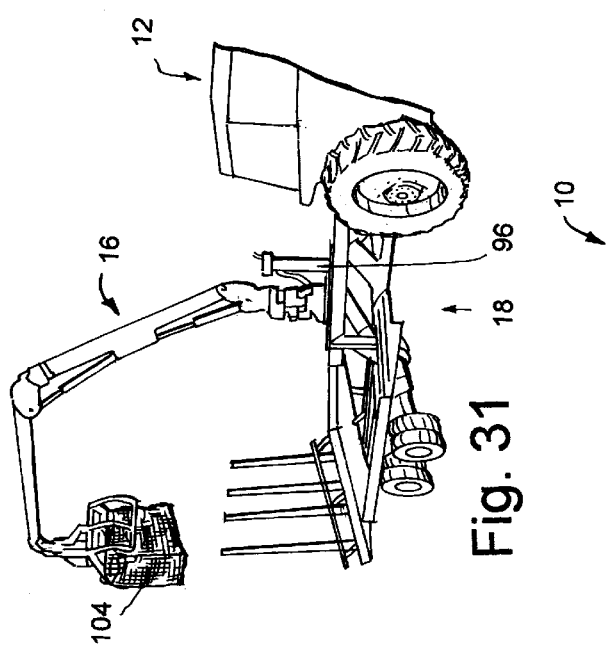
FIG. 31 is an illustration showing another perspective view of the bale loader apparatus grabbing a wet bale wrapped in plastic.

FIGS. 15–18 show the bumper bars 82 in a use position for handling wet bales 104, i.e. bales which have plastic wrapped around them to repel moisture. The bumper bars 82 effectively cover the tines 80 and prevent the tines 80 from puncturing or tearing a plastic covering around the bale 104. Enough force is generated by the tine cylinders 90 to squeeze and securely grab a wet bale 104 covered by plastic when the bumper bars 82 are in the use position. FIGS. 29–31 show the bale loader 10 moving wet bales 104.

Figure 32:
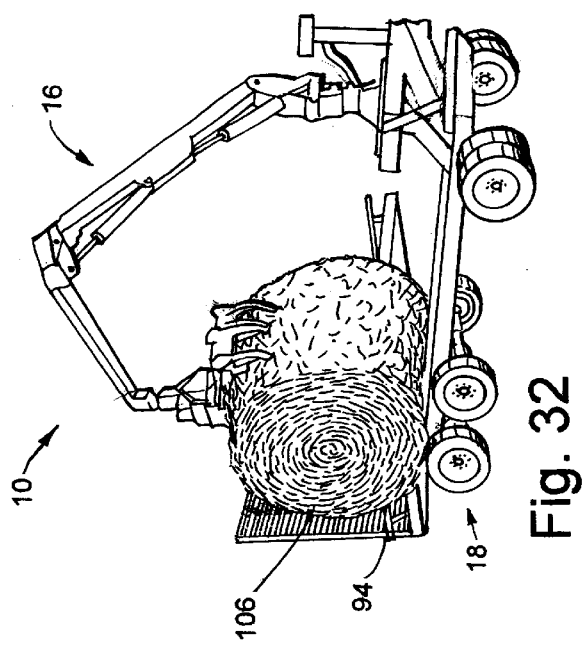
FIG. 32 is an illustration showing a perspective view of the bale loader apparatus loading a round bale.
Figure 34:
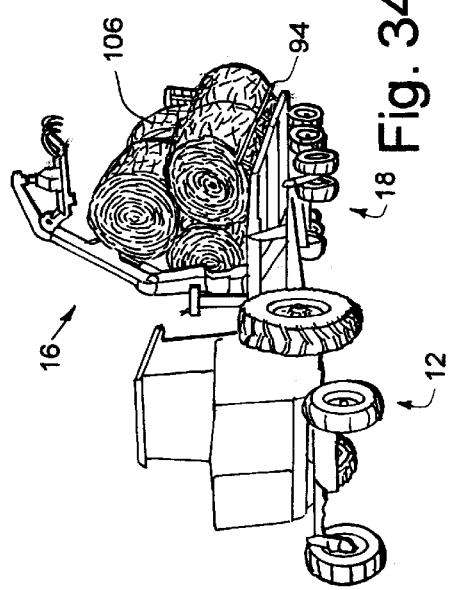
FIG. 34 is an illustration showing another perspective view of the bale loader apparatus with a loaded stack of round bales.
Figure 33:
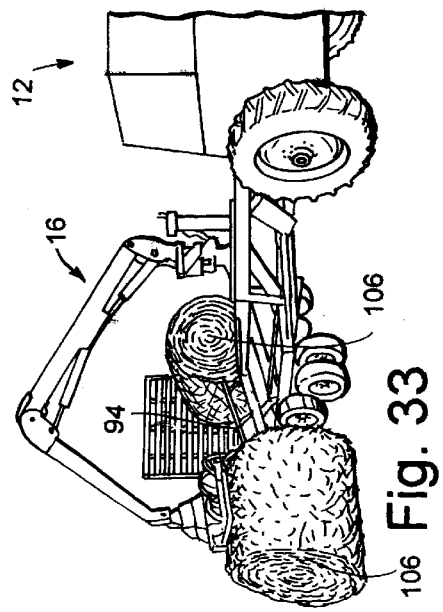
FIG. 33 is an illustration showing another perspective view of the bale loader apparatus loading a round bale.

As shown in FIGS. 19–34, side rails 94 may be attached to the bed 22. These side rails 94 allow the bed 22 of the trailer 18 to securely hold large round bales 106 in addition to large square bales. The side rails 94 are preferably removable. FIGS. 32–34 show the bale loader 10 moving round bales 106 on to the bed 22 of the trailer 18 in between the side rails 94.

The boom 16 is operated either with hydraulic controls 96 positioned on the trailer 18 next to the boom 16 or using the tractor's existing hydraulic controls. The hydraulic controls 94 are used to tilt the bed frame 22, rotate the mast 62, lift the main boom 64, extend the jib boom 66, rotate the head 68, extend the outriggers 36, retract the tines 80 of the grapple 76, and move the bumper bars 82 between the use and nonuse positions. The tractor 12 provides the source of hydraulic power, and also transports the bale loader 10. The two-point arms of the tractor 12 lift the front end of the bale loader 10. These hydraulic controls 96 allow an operator to operate the boom 16 to load bales on to the trailer 18, to tilt the bed 22 of the trailer 18 to neatly unload an entire stack of bales, and to operate the boom 16 to singly unload individual bales off of the trailer 18. It is anticipated that the functions of the bale loader 10 can be automated using proximity sensors on the end of the boom or contact switches on the joints of the boom. For example, an operator may guide the grapple to pick up a bale from the field, and then allow the bale loader 10 to automatically stack the bale on the bed frame 22 according to a previously programmed pattern for bales and a vehicle bed of a particular size.

A method of loading and stacking large bales using the bale loader generally comprises the steps of: (a) extending the movable outriggers; (b) grabbing a bale with the grapple; (c) lifting the bale using the boom; (d) placing the bale on the trailer in a manner to create a predetermined arrangement of bales; (e) tilting the tilt bed until the forks contact the ground; and (f) moving the bale loading apparatus from the predetermined arrangement of bales stacked at the desired storage location.

Referring to FIGS. 35–47, an example of the truck bed embodiment of the present invention is illustrated and generally indicated by the reference numeral 120. The vehicle bed 100b in the truck bed embodiment 120 generally comprises a bed frame 22 adapted for carrying a load, a fork including at least one tine 24 connected to an end of the bed frame 22, and a pivot mechanism 122 adapted for pivoting the bed frame 22 and the tines 24 between a first position and a second position with respect to a vehicle frame 20, i.e. the truck frame. The pivot mechanism 122 includes a pivot bed hinge 30, which may be formed by a pin inserted through apertures in the bed frame 22 and the vehicle frame 20 or extended frame work, and pivot cylinders 32. The truck bed embodiment 120 further includes a lift mechanism 124 adapted for lifting a load with respect to the vehicle frame 20 to compensate for a compressed vehicle suspension, a squeeze bar 126 adapted for holding a load on the bed frame 22, and push offs 128 adapted for pushing a load off of the tines 24 of the fork when the bed frame 22 and the fork in the second position.

Referring to FIGS. 36–37, the push off 128 includes a push off arm 130 having a load end 132 and a bed end 134, a contact bar 136, a lever 138, and a push off cylinder 140. The contact bar 136 is adapted for engaging the load at the load end 132 of the push off arm 130. The lever 138 extends between the bed frame 22 and the push off arm 130, and the cylinder 140 is operably connected between the lever 138 and the push off arm 130. As illustrated in the figures, the lever 138 preferably has a first leg 142 with a push off arm end 144 and a second leg 146 with a bed frame end 148. The lever 138 is pivotally connected to the push off arm 130 at the push of arm end 144 and is pivotally connected to the bed frame 22 at the bed frame end 148. The bed end 134 of the push off arm 130 is preferably formed with a cam follower 150, and the bed frame 22 is preferably formed with a slide or cam 152 within which the cam follower 150 is guided as the push off 128 is extended and retracted.

Referring to FIGS. 38–39, the squeeze bar 126 generally comprises at least one lever member 154 pivotally attached to the vehicle frame 20 and at least one squeeze bar cylinder 156 adapted for pivoting the lever member 154 with respect to the vehicle frame 20 into either a hold position shown in FIGS. 38 or a release position shown in FIGS. 39. The squeeze bar 126 preferably includes an adjustable arm 158 adapted for holding various size loads. The arm 158 is attached to an arm bracket 160 attached to a distal end of the lever member in a number of predetermined places by aligning a pin aperture 162 in the bracket 160 with one of the adjustment apertures 164 in the arm 158 inserting a pin through the apertures 162 and 164. One end of the arm 158 preferably has a contact bar 166 adapted for engaging the load.

Figure 41:
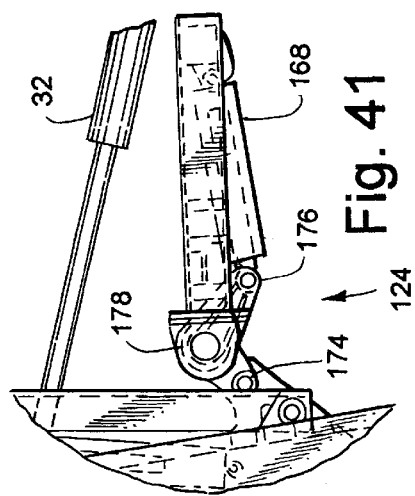
FIG. 41 is a view of the cam shown in Detail A of FIG. 40.
Figure 40:
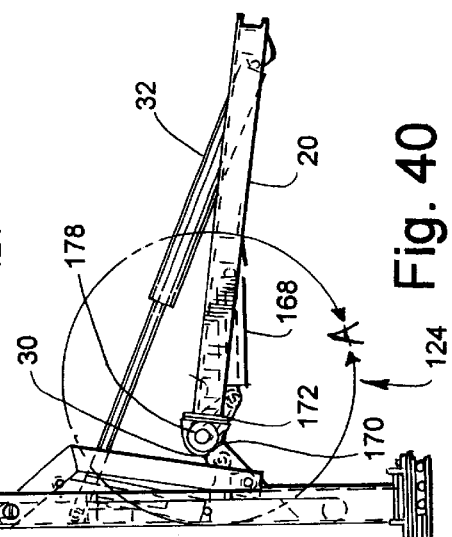
FIG. 40 is a side view of the lift portion of the truck bale loader apparatus of FIG. 35 with the lift cylinder in a retracted position and the pivot cylinder in an extended position.
Figure 42:
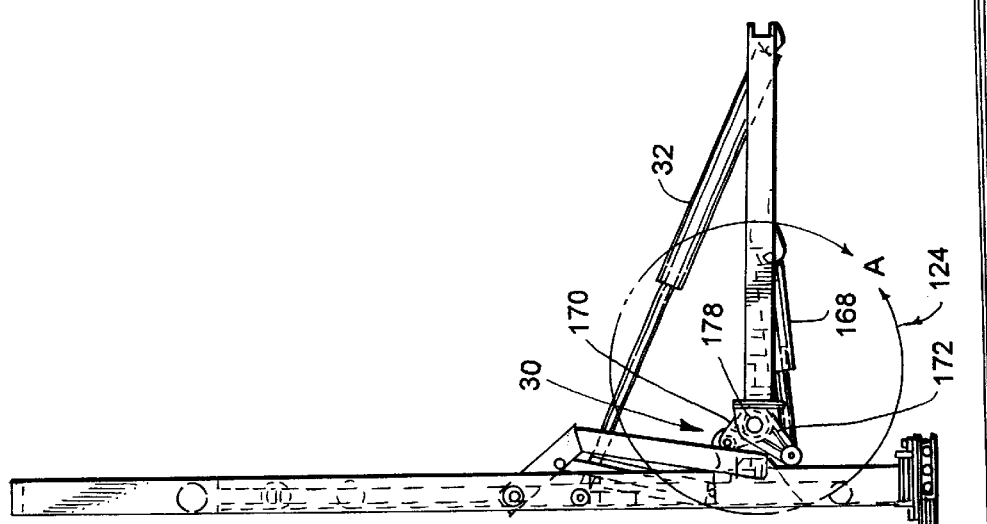
FIG. 42 is a side view of the lift portion of the truck bale loader apparatus of FIG. 35 with the lift cylinder in an extended position and the pivot cylinder in an extended position.
Figure 43:
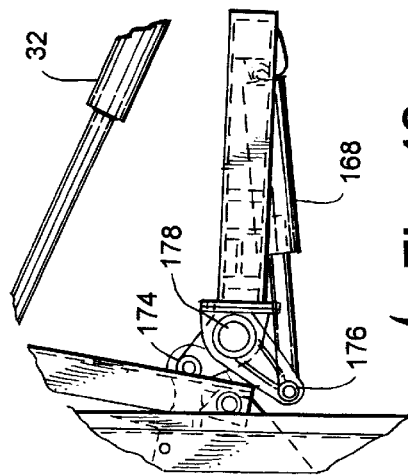
FIG. 43 is a view of the cam shown in Detail A of FIG. 42.
Figure 45:
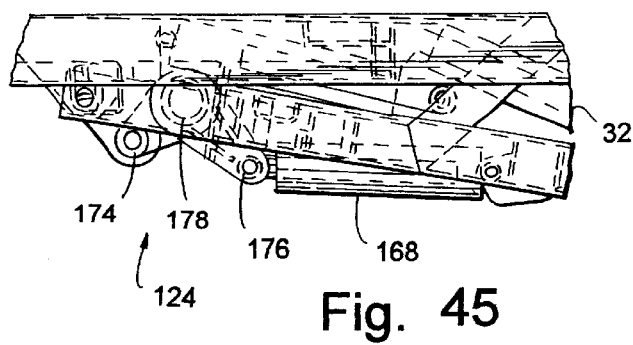
FIG. 45 is a view of the cam shown in Detail A of FIG. 44.
Figure 44:
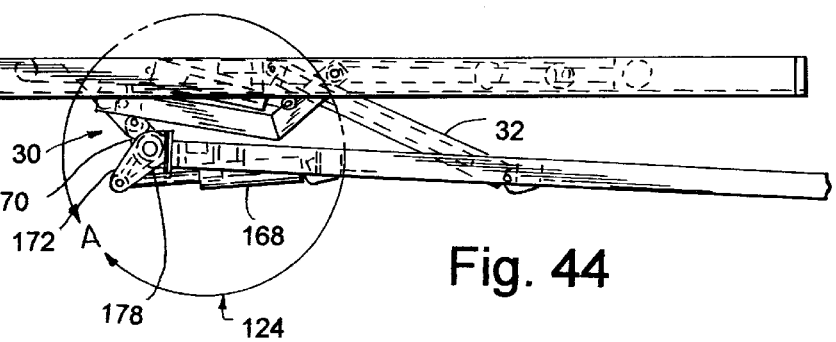
FIG. 44 is a side view of the lift portion of the truck bale loader apparatus of FIG. 35 with the lift cylinder in a retracted position and the pivot cylinder in a retracted position.
Figure 46:
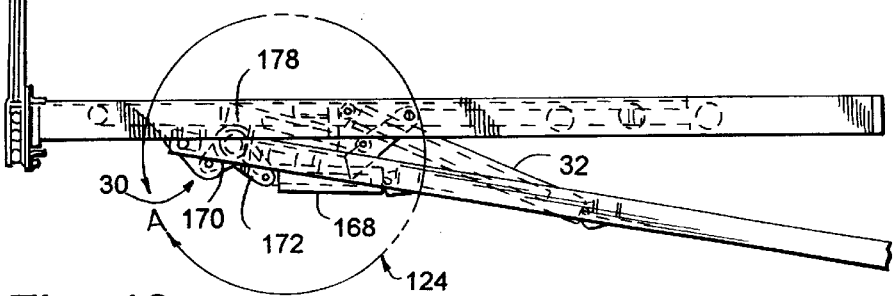
FIG. 46 is a side view of the lift portion of the truck bale loader apparatus of FIG. 35 with the lift cylinder in a retracted position and the pivot cylinder in an extended position.
Figure 47:
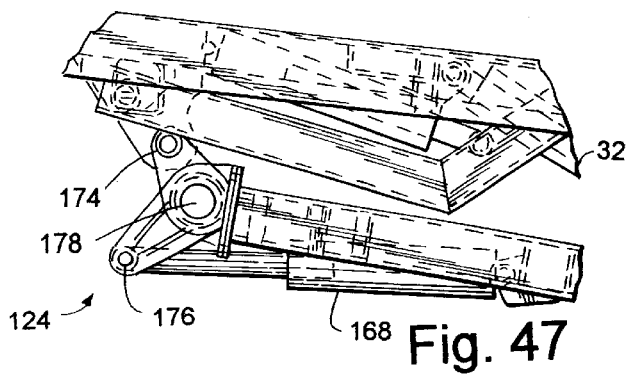
FIG. 47 is a view of the cam shown in Detail A of FIG. 46.
Figure 48:
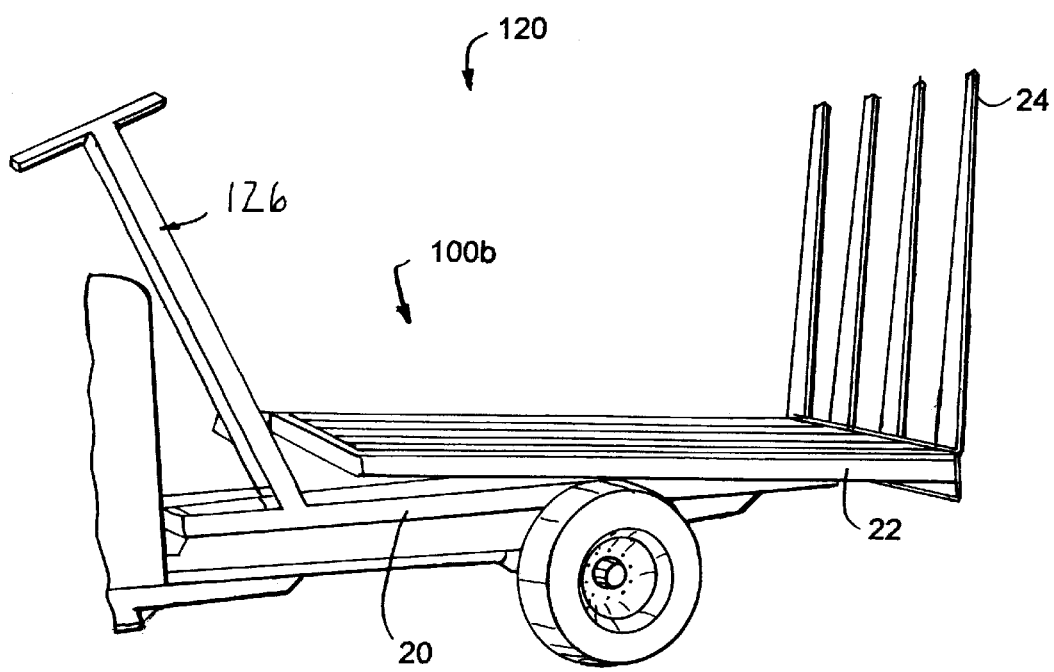
FIG. 48 is an illustration of a truck bale loader apparatus.

Referring to FIGS. 40–47, the lift mechanism 124 generally includes a lift cylinder 168, a first cam 170 having a distal bed end 174, and a second cam 172 having a distal lift cylinder end 176. The first cam 170 and the second cam 172 are pivotally mounted to the vehicle frame 20, and the first cam 170 is fixedly attached to the second cam 172 at a predetermined position, illustrated as a predetermined angular position, such that a partial rotation of the second cam 172 results in a partial rotation of the first cam 170, including a predetermined vertical component motion for the distal bed end 174 as illustrated in FIGS. 41 and 43. The first cam 170 and the second cam 172 each have a frame end 178, each of which have a sleeve aperture. The vehicle frame 20 includes a sleeve which extends through the sleeve apertures, thus forming a pivot point for the first cam 170 and second cam 172. The bed frame 22 is pivotally attached to the bed end 174 of the first cam 170 and forms the pivot bed hinge 30, and the lift cylinder 168 is operably connected between the vehicle frame 20 and the lift cylinder end 176 of the second cam 172 to raise and lower the bed end 174 of the first cam 170. The vertical component of the motion of the bed end 174 is approximately eight to nine inches in one embodiment, which is sufficient to compensate for the compression of the suspension of the truck that occurs when a load is lifted. Most of the compression occurs in the springs of the truck. The lift mechanism 124 is not illustrated in the bale loader embodiment since only the tires are compressed when a load is lifted.

Figure 35:
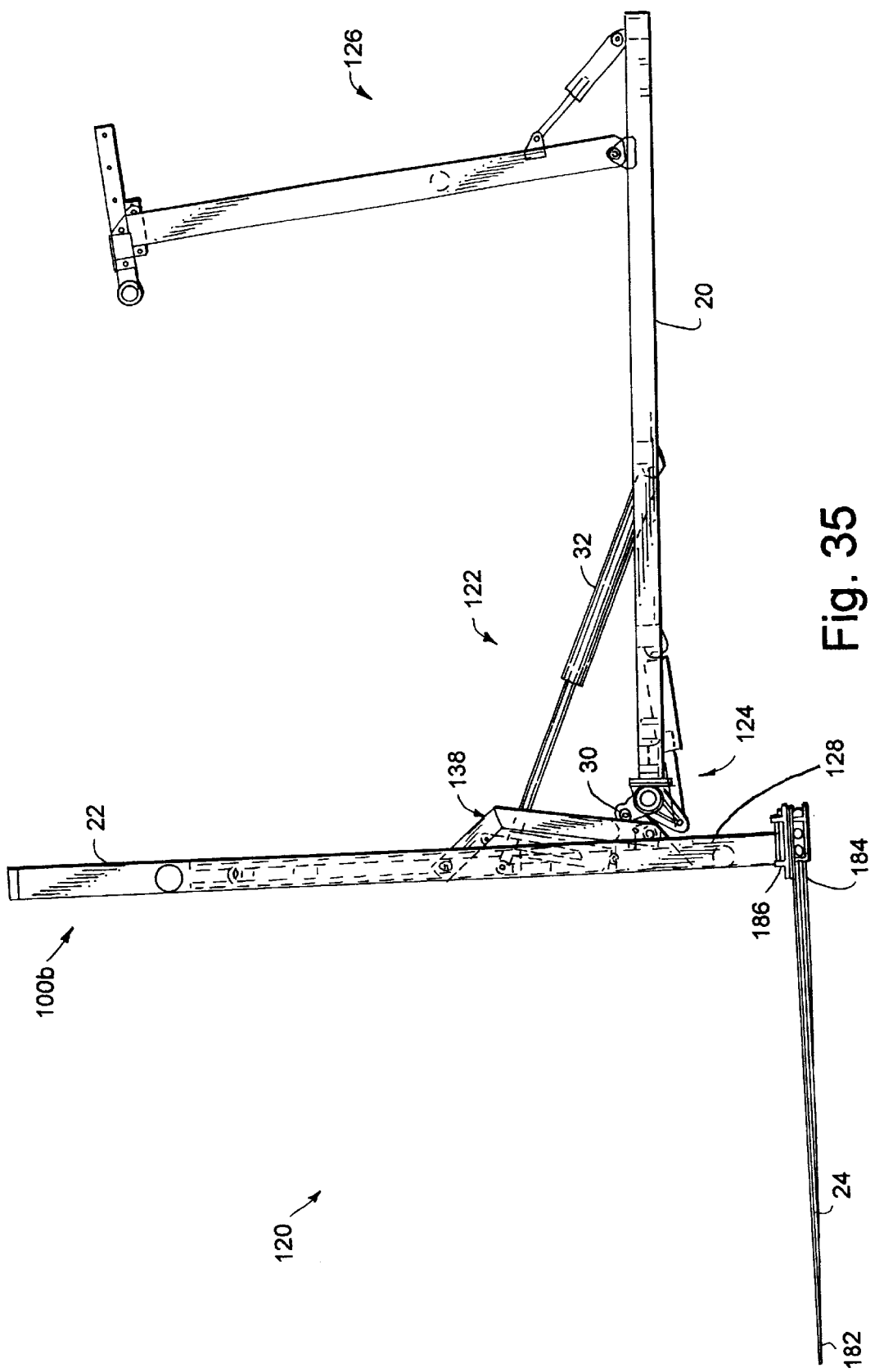
FIG. 35 is a side view of truck bale loader apparatus.

The fork is preferably a floating fork adapted for permitting a predetermined amount of play at a distal end 182 of the tines 24. As illustrated in FIG. 35, the proximal end 184 of the tines 24 are pivotally attached to a tine attachment bracket 186 mounted on one end of the bed frame 22. The bracket 186 is adapted to the tines 24 to pivot a predetermined amount and permit a predetermined amount of play at the distal end 182. The floating fork simplifies the alignment of the tines 24 beneath a stack of bales, whether or not a stack of bales is on a standard pallet, a "dumb pallet" defined as a pallet that comprises vertical spacers and little if anything else, or no pallet.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A trailer for handling and carrying hay bales and for use with a separate drive vehicle which provides motive power to the trailer, comprising: a trailer frame pivotally attachable to the vehicle whereby said trailer frame is movable vertically with respect to the vehicle when the connected vehicle and trailer moves over uneven ground, said trailer frame comprising:

(a) a bed frame adapted for carrying a load, said bed frame having an end;
    (b) a fork including at least one tine, said fork being connected to said end of said bed frame;
    (c) a pivot mechanism adapted for pivoting said bed frame and said fork between a first position and a second position with respect to a vehicle frame, wherein loads are transported on said bed frame in said first position and are moved off or on said fork in said second position; and
    (d) at least one mobile outrigger operably attached to said bed frame of said trailer frame and adapted for stabilizing said load on said trailer frame bed frame, said at least one outrigger being adapted for movement with said trailer frame when the connected vehicle and trailer is moving, whereby said at least one outrigger closely follows contours of uneven ground as said trailer frame moves vertically with respect to the vehicle over such uneven ground.

2. The trailer of claim 1, wherein said bed frame further includes side rails adapted for securely transporting large round bales.

3. The trailer of claim 1, wherein said at least one tine of said fork comprises multi-ply steel.

4. The trailer of claim 1, wherein said pivot mechanism includes a pivot bed hinge connected to said vehicle frame and said bed frame and further includes a cylinder adapted for pivoting said bed frame with respect to said vehicle frame.

5. The trailer of claim 1, wherein said at least one outrigger has an extendable distal end and a castor wheel operably connected at said distal end.

6. The trailer of claim 1, wherein said at least one outrigger is telescopically extendible and has at least one cylinder for extending a distal end thereof.

7. The trailer of claim 1, further comprising a boom having a swivel head adapted for handling and stacking bales on said vehicle bed.

8. The trailer of claim 7, wherein said boom includes a mast rotatably attached to said vehicle frame, a main boom pivotally attached to said mast, and a jib boom pivotally attached to said main boom, said head being swivably attached to said jib boom.

9. The trailer of claim 7, wherein said head is a two-in-one head adapted for handling dry bales and wet bales without puncturing plastic wrapped around said wet bales.

10. The trailer of claim 9, wherein said two-in-one head has a grapple including a set of opposing tines adapted for handling dry bales and a set of movable bumper bars, said bumper bars having a first position in which said set of opposing tines are allowed to penetrate said dry bales and a second position in which said set of opposing tines are prevented from puncturing said plastic wrapped around said wet bales.

11. A bale loader for handling and carrying hay bales and which is capable of carrying bales in a loaded or unloaded condition while moving, comprising:

(a) a vehicle for providing motive and hydraulic power, said vehicle having a chassis and at least two axles, each with associated ground engaging wheels, upon which said chassis is operatively supported;

(b) a separate trailer pivotally attached to said vehicle whereby said trailer is vertically movable substantially independently of and with respect to said vehicle when said bale loader moves over uneven ground, said trailer including: a bed frame adapted for carrying a load, said bed frame having an end; a fork including at least one tine, said fork being connected to said end of said bed frame and being substantially orthogonal to said bed frame; and a pivot mechanism adapted for pivoting said bed frame and said fork between a first position and a second position with respect to said trailer, wherein loads are transported on said bed frame in said first position and are moved off or on said fork in said second position;

(c) a boom having a mast rotatably attached to said trailer, a main boom pivotally attached to said mast, a jib boom pivotally attached to said main boom, and a head swivably attached to said jib boom, said boom being adapted for handling and stacking bales on said bed frame, said swivel head being a two-in-one head adapted for handling dry bales and wet bales without puncturing plastic wrapped around said wet bales; and (d) at least two mobile outriggers operably attached to said trailer and adapted for stabilizing said load on said trailer bed frame, said at least two mobile outriggers being telescopically extendible, said outriggers being adapted for movement with said trailer when said bale loader is moving, whereby said outriggers follow contours of and engage uneven ground as said trailer moves vertically with respect to said vehicle over such uneven ground.

12. A two-in-one bale head for use with a bale loading system adapted for handling dry bales and wet bales of agricultural material without puncturing plastic wrapped around said wet bales, comprising a set of opposing tines and a set of movable bumper bars, said set of opposing tines being adapted for handling dry bales, said set of opposing bumper bars having a first position in which said set of opposing tines penetrate said dry bales and having a second position in which said set of opposing tines are prevented from puncturing said plastic of said wet bales.

* * * * *